June 15, 1965 M. MILLETT 3,189,690

TWO-WAY TELEPHONE SYSTEMS WITH TALK-LISTEN SWITCHING

Filed April 26, 1961

INVENTOR
Michael Millett

Eugene J. Kalil
ATTORNEY

United States Patent Office 3,189,690
Patented June 15, 1965

3,189,690
TWO-WAY TELEPHONE SYSTEMS WITH TALK-LISTEN SWITCHING

Michael Millett, London, England, assignor to Modern Telephones (Great Britain) Limited, London, England, a British company Filed Apr. 26, 1961, Ser. No. 105,815
Claims priority, application Great Britain, Apr. 27, 1960, 14,811/60
11 Claims. (Cl. 179—81)

Figure 1:
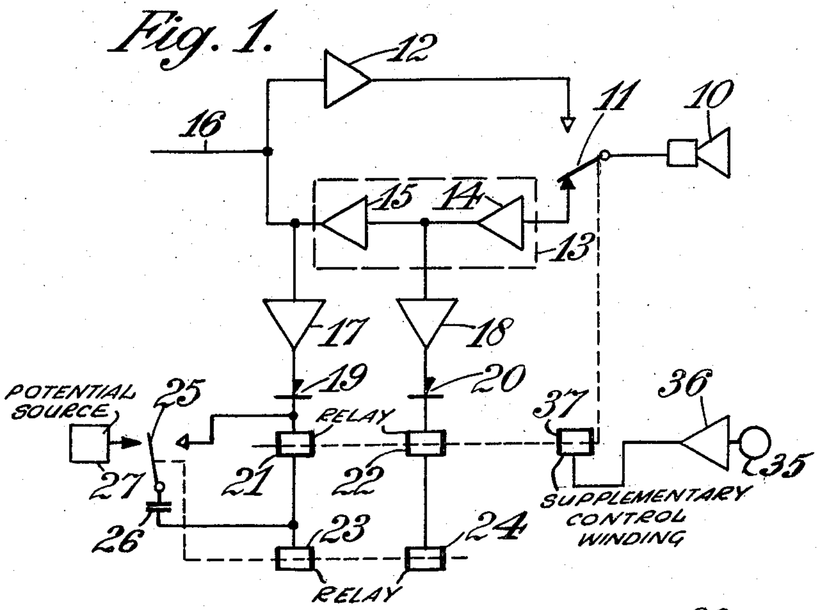

This invention relates to telephone systems with talk-listen switching for two-way speech communication over an interconnecting circuit between two stations. Such systems commonly use a loudspeaker at one or both stations and the loudspeaker may also be used for use as a microphone.

It is an object of the invention to provide at one of the stations of an improved system separate speech channels with amplifiers for incoming and outgoing speech signals simply connected to the interconnecting circuit to other stations, which circuit is common to speech signals in both directions.

It is another object of the invention to provide at said one station a control signal when there is a speech signal present in the interconnecting circuit, irrespective of the direction of the speech signal.

It is another object of the invention to condition the speech channels for the passage of incoming signals only whenever incoming signals are present in the interconnecting circuit, but to inhibit such conditioning by the presence of outgoing signals in the interconnecting circuit by inhibiting means responsve to speech for outgoing transmission. Thus, if there is no incoming signal, then if anyone should speak into a transducer at the station, the inhibiting means will prevent the outgoing speech signals from switching the speech channels and thus there will be no interference with the transmission of the outgoing speech.

The switch means conditioning the speech channels may be a mechanical switch such as a relay or may be an electronic switching system. The switch means may readily be made to respond to incoming signals of a very low level, if necessary, so permitting communication over a long line or a line with a large loss, the limit being set by the noise level. Moreover, it is possible to provide automatic gain control for speech in either or both directions without affecting the operation of the switching.

The aforementioned inhibiting means may be circuit means operative to derive an opposing control signal from the outgoing speech channel.

Conveniently signals on the interconnecting circuit, that is, both incoming and outgoing signals, are amplified in a first limiting amplifier to provide the first-mentioned control signal and a second limiting amplifier is provided responsive only to the outgoing speech signals to provide the opposing control signal. Preferably the outputs of these two amplifiers are rectified to provide direct current control signals. In a mechanical switch arrangement, the rectified outputs of the limiting amplifiers may be applied to opposed windings of a relay so that, if there is a signal from the line, the relay operates whether or not outgoing signals are present and, if there is no signal from the line, the relay remains unoperated independent of the presence or absence of outgoing signals. The rectified outputs may be integrated by shunt capacitances. In general it is desirable to obtain the highest speed of switching to avoid clipping the beginning of an incoming speech syllable and therefore no integration would be employed. In that case, however, it is desirable to avoid chatter due to switching back of the system at the end of each syllable and a delay in the reverse switching direction is desirable.

To ensure rapid switching of the amplifier channels at the beginning of incoming speech, it is desirable that the rectified control signal and opposing signal, which will have envelopes dependent on the speech modulation, if there is no integrating, should be simultaneously in opposition and proper account should be taken therefore of the phase of the signals to be rectified.

If electronic switching is to be employed, limiting amplifiers with rectifying circuits may be employed as described above and the outputs of the rectifying circuits conveniently are used for biasing the amplifiers in the incoming conditioning of the speech channels for the appropriate directions of communication.

In the arrangements thus far described, any incoming speech signals will always condition the system appropriately for that direction of communication. The distant speaker may therefore break into and interrupt outgoing speech. Over-ride means may be provided to enable incoming speech to be interrupted. For this purpose, there may be provided a mechanically operated switch. However there may be provided various forms of voice-operated over-ride circuit, the nature of which may depend on the type of voice for which the loudspeaking telephone is installed. For example, there may be provided a separate amplifier amplifying any sound signals at the station and arranged to provide an over-ride control. This amplifier would be arranged so that only signals louder than any break-through from the loudspeaker (or other reproducer) would operate the over-ride control.

In the arrangements described above, at each station having said switch means, there may be provided a transducer arranged also to act as a microphone. The transducer may be switchably connected by a relay either to the input of an outgoing speech amplifier or to the output of an incoming speech amplifier, the relay constituting the aforementioned switch means. Alternatively the transducer may be permanently connected to the incoming and outgoing speech amplifiers and the switching effect by control signals applied to the amplifiers. A separate microphone may be provided to give an over-ride control signal to enable the operator at the station to interrupt the incoming speech and reverse the direction of communication. The separate microphone is positioned so that it does not receive any substantial signal from the loudspeaker.

Figure 2:
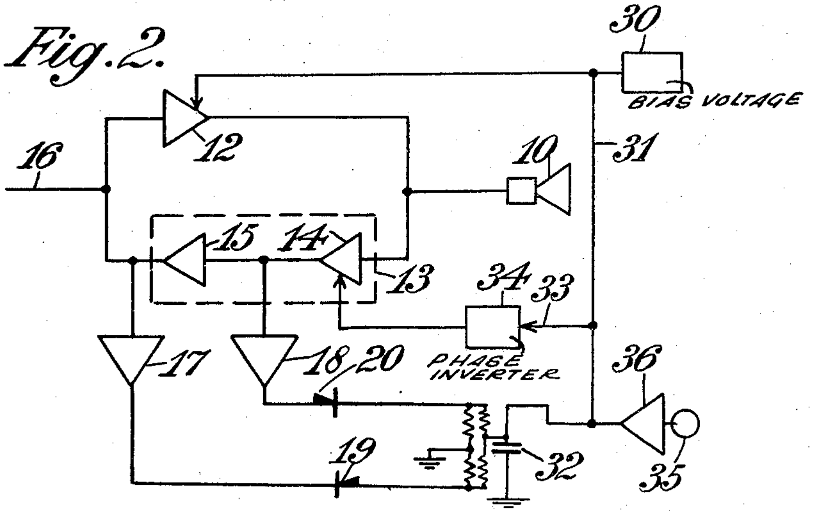

In the following description reference will be made to the accompanying drawings in which FIGURES 1 and 2 are each block diagrams illustrating stations for a two-way speech communication system.

Referring to FIGURE 1, there is illustrated one station of a loudspeaking telephone system having stations interconnected by a two-wire line. The other stations of the system may be similar or may be any other type of telephone station making use of a two-wire line for both incoming and outgoing speech. In FIGURE 1 there is shown a transducer 10 comprising a loudspeaker arranged so as to act as a microphone, which loudspeaker is connected by a changeover contact 11 of a relay alternatively either to the output of an amplifier 12 for incoming speech signals or to the input of an amplifier circuit 13 having at least two stages 14, 15 for amplifying outgoing speech signals. The relay contact 11 normally connects the loudspeaker to the outgoing speech amplifier. The two-wire line, indicated conventionally at 16, is connected either directly or through a hybrid unit (not shown) to the input of the incoming signal amplifier 12 and the output of the outgoing signal amplifier 13. There are also provided two limiting amplifiers 17, 18 one of which 17 amplifies signals on the aforementioned two-wire line 16 and the other 18 amplifies outgoing speech signals, conveniently taken from between the two stages 14, 15 of the outgoing speech amplifier circuit 13. The outputs of these two limiting amplifiers 17, 18 are separately rectified by half-wave rectifiers 19, 20 and fed into opposed windings 21, 22 of a relay operating coil which controls the aforementioned changeover contact 11. The two relay windings 21, 22 are arranged so that, if signals are present on the two-wire line, the relay will operate to switch the relay over from its normal condition, connecting the loudspeaker 10 to the outgoing speech amplifier channel 13, to the operated condition connecting the loudspeaker 10 to the incoming speech amplifier 12. The two limiting amplifiers 17, 18 are arranged that outgoing speech signals will provide opposed control signals for the relay of equal magnitude and in phase so that the relay 21, 22 will not operate on outgoing speech signals. To prevent chopping at the end of a syllable it is desirable that the release of the relay 21, 22 should be delayed. For this purpose the rectified outputs of the two limited amplifiers are fed also to opposed windings 23, 24 of a second relay which second relay controls a changeover contact 25. The changeover contact 25 when operated connects a capacitor 26 in shunt across the control winding 21 of the first relay, i.e., the winding energised by speech signals on the line. Preferably the capacitor 26 is normally connected to a source 27 of charging voltage so that it is charged to an appropriate level such that, when connected across the relay winding 21, it aids the current through the winding 21. This prevents chatter such as might occur if an uncharged condenser were connected across the winding and had to draw a charging current.

This second relay 23, 24 is made slower to operate than the first relay 21, 22 so that a noise impulse or a speech ejaculation on the two-wire line 16 will only operate the first relay 21, 22 for a time marginally longer than the period of the impulse. Provided the second relay 23, 24 is sufficiently slow, it will not operate on such an impulse and thus there will be no delay in the release of the first relay 21, 22. A few syllables of speech, however, will operate the second relay 23, 24 so as to ensure that there is a delay in the subsequent release of the first relay 21, 22.

A modification of the arrangement of FIGURE 1 using electronic switching is illustrated in FIGURE 2. In FIGURE 2 the same references are used as in FIGURE 1 for corresponding components. In FIGURE 2, the transducer 10 is permanently connected to the output of the incoming speech amplifier 12 and also to the input of the outgoing speech amplifier 13 which has two stages 14, 15. The two-wire line 16 is connected to the input of the incoming speech amplifier 12 and to the output of the outgoing speech amplifier 13 either directly or through the hybrid unit (not shown). Limiting amplifiers 17, 18 with rectifiers 19, 20 are provided as described in the previous embodiment. The incoming speech amplifier 12 is normally cut off by a biasing voltage from a bias voltage source 30 and is brought into operation by a control signal on line 31 which overcomes the biasing voltage. This control signal is provided by the rectified output of the limiting amplifier 17 amplifying the signals on the two-wire line 16. The second limiting amplifier 18 provides an opposing control signal so that, if there are outgoing speech signals only, the two limiting amplifiers 17, 18 with their rectifiers 19, 20 will provide opposing signals to ensure that the incoming speech amplifier remains cut off. The control signal and, if present, the opposing control signal are applied via a resistive network to a capacitor 32 which will be rapidly charged by the control signal since the charging circuit is made to have a low impedance. The capacitor thus does not introduce any appreciable delay in the initial switching when an incoming speech signal first appears. It does however delay the return of the circuits to the condition for outgoing speech so preventing switching during the intervals between successive syllables. The capacitor 32 is connected also to the outgoing speech amplifier by a control line 33 applying the signal to the amplifier to overcome the cut-off bias. The outgoing speech amplifier is controlled by an inverted signal from the control line for the incoming speech amplifier, the control signal being fed through a D.C. coupled phase inverter 34 to invert the polarity for this purpose. When there are outgoing speech signals, however, the normal cut-off bias for the incoming speech amplifier, when inverted, might disturb the outgoing speech amplifier and this saturating bias may be removed if necessary by a diode or diodes subsequent to the phase inverter 34. The control circuits have time constants such that the outgoing speech amplifier 13 is cut-off faster than the incoming speech amplifier 12 is switched on. The fast operation for cutting off the outgoing speech amplifier 13 may be obtained by making the internal impedances of the limiting amplifiers 17, 18 and their detectors 19, 20 low. The two detectors 19, 20 will have opposite poles connected to the aforementioned capacitor 22 since they are to provide outputs of opposite polarity. Thus together with the limiting amplifiers 17, 18 they form a series circuit having a low impedance in the direction of current flow for the switching on of the incoming speech amplifier 12. It will be seen that the charge time will be independent of the discharge time so that the return delay may be longer if so desired.

In either of the two embodiments of FIGURES 1 and 2 it will be seen that if there are any incoming speech signals, the operator at the station cannot interrupt the incoming speech to reverse the direction communication. Over-ride means may be provided to enable the operator at the station with the amplifiers and switching circuits to interrupt incoming speech. For this purpose there is provided a separate microphone 35 which is positioned so that it does not receive any substantial signal from the loudspeaker. The separate microphone 35 is arranged so that, if the user speaks in a slightly louder voice than usual, it provides an output signal which, after amplification in an amplifier 36, is used as a supplementary control signal to switch the speech channels to condition the system for outgoing speech. In the system employing a relay as described with reference to FIG. 1, the microphone 35 may be provided with a separate amplifier 36 feeding a supplementary control winding 37 on the first relay 21, 22 so as to oppose the control signal derived from the incoming speech. In the embodiment of FIGURE 2 using electronic switching of the amplifiers 12, 13, the supplementary control signal from the amplifier 36 may be provided as an additional bias control to ensure the required switching.

I claim:

1. A telephone system for two-way speech communication over an interconnecting circuit between stations which circuit is common to speech signals in both directions wherein there are provided at one of the stations separate speech channels with amplifiers for incoming and outgoing speech signals, control means at that station adapted to provide a control signal when there is a speech signal in either direction present in said interconnecting circuit, switch means normally responsive to said control signal to condition the speech channels for passage of incoming signals only and inhibiting means responsive to speech for outgoing transmission from the station to prevent the switching means from responding to said control signal.

2. A telephone system as claimed in claim 1 wherein said inhibiting means are circuit means operative to derive a second control signal from the outgoing speech channel.

3. A telephone system as claimed in claim 2 wherein signals on the interconnecting circuit are amplified in a first limiting amplifier to provide the first mentioned control signal and wherein a second limiting amplifier is provided responsive only to the outgoing speech signals to provide the second control signal.

4. A telephone system as claimed in claim 3 wherein the outputs of the two limiting amplifiers are rectified to provide direct current control signals.

5. A telephone system as claimed in claim 4 wherein said switch means includes a relay, means for applying the rectified outputs of the limiting amplifiers to opposed windings of the relay so that, if there is an incoming signal from the line, the relay operates whether or not outgoing signals are present and, if there is no incoming signal from the line, the relay remains unoperated independent of the presence or absence of outgoing signals.

6. A telephone system as claimed in claim 4 wherein said switch means comprises electronic switching means, said rectified outputs being applied to bias the amplifiers in the incoming and outgoing speech channels to effect the necessary conditioning of the speech channels for the appropriate directions of communication.

7. A telephone system as claimed in claim 1 wherein said amplifiers, control means, switch means and inhibiting means are provided at each station.

8. A telephone system as claimed in claim 1 wherein, at each station having said switch means, there are provided over-ride means to enable incoming speech to be interrupted.

9. A telephone system as claimed in claim 8 wherein said over-ride means comprise a mechanically operated switch.

10. A telephone system as claimed in claim 8 wherein said over-ride means comprise a separate amplifier with a separate microphone amplifying any sound signals at the station and arranged to provide an over-ride control signal.

11. A telephone system as claimed in claim 1 and having, at each station provided with said switch means, a transducer comprising a loudspeaker arranged also to act as a microphone.

References Cited by the Examiner

UNITED STATES PATENTS

| | | | |
|---|---|---|---|
| 1,924,131 | 8/33 | Sandemann | 179—170 |
| 2,093,525 | 9/37 | Mitchell | 179—170 |
| 2,129,990 | 9/38 | DeFremmey | 179—170 |
| 2,267,622 | 12/41 | Mitchell | 179—170 |
| 2,356,943 | 8/44 | Norwine | 179—170 |
| 2,424,069 | 7/47 | Tschumi | 179—170 |
| 2,468,553 | 4/49 | Herrick | 179—170 |
| 2,819,340 | 1/58 | Brody | 179—1 |
| 3,066,201 | 11/62 | Beucher | 179—170 |

ROBERT H. ROSE, *Primary Examiner.*

WALTER L. LYNDE, *Examiner.*